United States Patent Office 2,885,295
Patented May 5, 1959

2,885,295

COATING COMPOSITION AND PROCESS

Harold A. McCord, Los Angeles, Calif., assignor to MLLK Corporation, Los Angeles, Calif., a corporation of California No Drawing. Application April 9, 1956
Serial No. 576,828

4 Claims. (Cl. 106—2)

This invention relates to coating compositions and has particular reference to a composition of matter useful in eliminating adhesion of uncured rubber stock for conventional packaging materials incurred during storage and shipping.

The adhesion of uncured synthetic rubber stock to conventional packaging materials such as cardboard, kraft paper and the like has presented a serious problem to the rubber manufacturer. Heretofore, this natural adhesion has required that the uncured rubber stock be coated with soapstone, mica or other inert mineral matter.

The packaging material also required a coating usually based on the aforementioned materials. The soapstone, etc., coating on the uncured rubber stock serves two purposes. The first is to provide lubricant qualities permitting relatively facile insertion of the rubber into the package, and the second to prevent adhesion to the packaging material during subsequent storage and shipment. Although this system is satisfactory, it does have certain pronounced disadvantages. It causes a considerable amount of air pollution when the soapstone powder, etc., is applied to the rubber and when the rubber is inserted into the packaging material. This requires a considerable amount of maintenance in (1) keeping the objectionable and hazardous powder away from operators; and (2) keeping the packaging area clean. Additionally, at the rubber fabricator's plant where the thus shipped rubber is received, considerable amounts of powder (soapstone, mica, etc.) must be removed when the package is broken into. Further disadvantages are that the package must be larger with its concomitant objectionable increased cost to accommodate the powder. Associated with this are the increased storage and shipping costs.

Another procedure which has been used previously to package uncured synthetic rubber is the treatment with chlorine (either gaseous or dissolved in water) prior to packaging. However, this treatment is not only hazardous but it alters the chemical composition of the rubber which, for a good many applications, interferes with its subsequent processing.

Still another procedure employs wrapping the stock in polyethylene prior to packaging. This is a relatively expensive procedure. The rubber in this packaged condition must be mixed in high powered mixers to completely disperse the polyethylene within the rubber, since it cannot be physically removed. Unfortunately, many rubber fabricators do not have mixers of this kind. Those that do incur higher costs due to the additional mixing time required to disperse the polyethylene. Moreover, the base composition of the rubber through this process is changed and may be objectionable for certain processing operations.

One of the principal objects of this invention is, therefore, to provide a composition and process which overcomes the above and other disadvantages of the prior art.

Another more specific object of the present invention is to provide an inexpensive and easily applied coating composition for uncured rubber stock or for the packaging material containing the same, the composition permitting easy insertion of the stock into the package and wholly preventing any adhesion between the stock and the packaging material.

Other objects and advantages of this invention it is believed will be readily apparent from the following detailed description of preferred embodiments thereof.

Briefly, the composition consists of a mixture of a soluble and an insoluble soap filled with a mineral filler and modified with sulfur.

Although filled or unfilled soluble soaps are known to be suitable parting agents for rubber, they unfortunately are not suitable when allowed to dry. They tend to crack, flake or completely fall off the packaging material, leaving unprotected spots to which rubber may easily bond. This bonding (adhesion) prevents the removal of the packaging material.

I have discovered that when a filled or unfilled soluble soap is modified with an insoluble soap, the aforementioned difficulties are overcome. In fact, not only is the integrity of the coating satisfactory when dry (no checking, flaking, etc.), but the dry coating becomes an effective lubricant permitting easy insertion of the rubber stock into preformed packaging material (viz., kraft paper base corrugated cartons) by simply sliding into the package.

Certain raw rubber stock tends to flow excessively during storage and shipping. In certain cases this flow may tend to dislodge the dry film allowing for adhesion. I have discovered that judicious quantities of sulfur or its organic analogs tend to slightly harden the surface of the stock without affecting the over-all properties of the rubber when compounded by a fabricator.

The manufacture of the soluble soap constituent of the composition of this invention is conventional. Thus, an oil or fat is placed in a steel kettle. Sodium hydroxide or potassium hydroxide is added in an amount sufficient to saponify the oil (one mol for every fatty acid equivalent present in the oil) and heat applied generally with live steam, during which time the mass is continuously stirred. When the mass becomes pasty, salt may be added to facilitate removal of the soap or it may be continued to be heated until completely saponified. The thus formed soap is allowed to cool and solidify. However, it is sometimes useful to run the soap into water to give a desired concentration (viz., 20%) from the standpoint of mixing (compounding).

Some suitable oils and fats for the preparation of soluble soaps useful in the present invention are: prime pecan oil; olive oil; coconut oil; palm oil; tallow; bone grease; and cottonseed oil.

The preparation of the insoluble soap constituent is also conventional. As is well known, insoluble soaps can be prepared directly from soluble soaps. Such preparation consists in treating a soluble soap with a metal salt in stoichiometric equivalents and removing the precipitated insoluble soap by conventional means (filtration) and allowed to dry. A typical reaction would be:

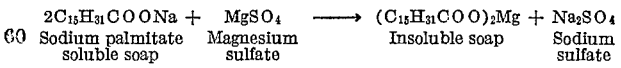

| 2C$_{15}$H$_{31}$COONa + | MgSO$_4$ | ⟶ | (C$_{15}$H$_{31}$COO)$_2$Mg + | Na$_2$SO$_4$ |
|---|---|---|---|---|
| Sodium palmitate soluble soap | Magnesium sulfate | | Insoluble soap | Sodium sulfate |

Some typical metal radicals for producing insoluble soaps are: lead; copper; aluminum; magnesium; cadmium; zinc; mercury; iron; cobalt; nickel and chromium.

Typical fillers are: mica, soapstone, perlite, vermiculite, silica, etc. The manufacture of these materials is well known in industry. They may be used singly or in combination with each other. The particle size diameter of the filler should be in the order of 1–10,000 microns.

The following variations by percent volume can be used in formulating compositions within the scope of the present invention:

| | Percent |
|---|---|
| Soluble soap | 1–90 |
| Insoluble soap | 1–90 |
| Filler | Up to 80 |
| Sulfur | Up to 10 |

The following specific examples are illustrative of the compositions of the present invention, but it is not intended to limit the invention thereto:

Example 1

| | Percent by weight |
|---|---|
| Coconut oil soap (15% in water) | 53 |
| Zinc stearate | 15 |
| Soapstone | 30 |
| Sulfur | 2 |

Example 2

| | |
|---|---|
| Pecan oil soap (20% in water) | 32 |
| Zinc stearate | 22 |
| Mica | 27 |
| Sulfur | 3 |
| Water | 16 |

Example 3

| | |
|---|---|
| Cottonseed oil soap (25% in water) | 25 |
| Lead oleate | 15 |
| Silica | 25 |
| Sulfur | 1 |
| Water | 34 |

Example 4

| | |
|---|---|
| Tallow soap (20% in water) | 50 |
| Aluminum oleate | 25 |
| Perlite | 20 |
| Sulfur | 5 |

Example 5

| | |
|---|---|
| Palm oil soap (20% in water) | 42 |
| Cadmium oleate | 18 |
| Vermiculite | 20 |
| Mica | 10 |
| Sulfur | 10 |

In the composition of the foregoing examples it will be seen that the amount of water-soluble soap varies between about 5 to 10% by weight, the amount of water-insoluble soap varies between about 15 to 25% by weight, and the amount of sulfur varies between about 1 to 10% by weight, the inert filler and water making up the remainder of the mixture. The ratio of water-soluble soap to water-insoluble soap in the exemplified compositions, therefore, ranges between about 1:1.5 and 1:5.

The soluble soaps of the above examples comprised the potassium salts.

Mixing of the ingredients is best accomplished, but is not limited to, the following procedure:

The sulfur is stirred into the soluble soap and when completely dispersed, the insoluble soap is added with stirring, until a uniform dispersion is achieved. The filler is then added and stirred until it is also dispersed. Water or aqueous alcohol is then added to thin the mixture.

The slurry is best applied by rollers to the packaging material (such as paper, cardboard, kraft paper, corrugated reinforced base cardboard, jute paper cardboard, plastics, etc.), although brushing or spraying is satisfactory. The excess coating material is removed by squeezing. The coated packaging material is dried at ambient temperature or force dried at temperatures in the order of 150° F. to speed the coating operation. The composition may also be applied to the rubber stock itself as a parting agent to permit stacking of blocks of the uncured stock without packaging. The coated packaging material may be stacked one upon the other even when partially dried since it is non-blocking.

Having fully described my invention, it is to be understood that I do not wish to be limited to the details set forth, but my invention is of the full scope of the appended claims.

I claim:

1. An aqueous coating composition consisting essentially of from about 1 to 90% by volume of a water-soluble soap, from about 1 to 90% by volume of a water-insoluble soap, sulfur in an amount not over 10% by volume, and an inert filler in an amount not over 80% by volume.

2. A coating composition for preventing adhesion of rubber stock to a surface, consisting essentially of a mixture of a water-soluble soap, a water-insoluble soap, an inert filler, and a minor proportion of sulfur effective only to harden the surface of the rubber stock, the weight ratio of water-soluble soap to water-insoluble soap ranging between about 1:1.5 and 1:5.

3. A process for preventing adhesion of the surface of rubber stock to an adjoining surface, comprising the step of applying the composition of claim 2 to at least one of said surfaces.

4. A coating composition for preventing adhesion of rubber stock to a surface, consisting essentially of a mixture of from about 5% to about 10% by weight of a water-soluble soap, from about 15% to about 25% by weight of a water-insoluble soap, from about 1% to about 10% by weight of sulfur, and an inert filler.

References Cited in the file of this patent

UNITED STATES PATENTS

| 1,697,936 | Teupel | Jan. 8, 1929 |
| 2,287,270 | Partridge | June 23, 1942 |
| 2,438,135 | Swartz et al. | Mar. 23, 1948 |

OTHER REFERENCES

Condensed Chemical Dictionary, 4th edition (1950), Reinhold Publication Corp. (pages 573 and 636–637 relied upon).